(12) United States Patent
Hsueh et al.

(10) Patent No.: US 7,855,491 B2
(45) Date of Patent: Dec. 21, 2010

(54) PRESTRESS-ADJUSTABLE PIEZOELECTRIC GRIPPING DEVICE

(75) Inventors: Po-Wen Hsueh, Kaohsiung (TW);
Cheng-Yen Chen, Kaohsiung (TW);
Chung-Hsien Lin, Kaohsiung (TW);
Shih-Wei Hsiao, Kaohsiung (TW);
Wu-Sung Yao, Kaohsiung (TW);
Mi-Ching Tsai, Kaohsiung (TW)

(73) Assignee: Metal Industries Research & Development Center, Kaohsiung (TW)

( * ) Notice: Subject to any disclaimer, the term of this patent is extended or adjusted under 35 U.S.C. 154(b) by 187 days.

(21) Appl. No.: 12/346,099

(22) Filed: Dec. 30, 2008

(65) Prior Publication Data
US 2010/0109477 A1    May 6, 2010

(30) Foreign Application Priority Data
Nov. 5, 2008   (TW) ............................... 97142693 A

(51) Int. Cl.
*H01L 41/08* (2006.01)
*H02N 2/04* (2006.01)
(52) U.S. Cl. .............. 310/328; 310/323.16; 310/316.01

(58) Field of Classification Search ................. 310/328, 310/323.16–323.19, 316.01, 317, 311, 333, 310/365, 323.02, 357, 330; 294/86.4; 244/19; B65H 67/06; H02N 2/04
See application file for complete search history.

(56) References Cited

U.S. PATENT DOCUMENTS

| 4,666,198 A * | 5/1987 | Heiserman | 294/86.4 |
| 6,373,170 B1 * | 4/2002 | Hills | 310/328 |
| 2007/0296310 A1 * | 12/2007 | Kim et al. | 310/328 |

* cited by examiner

*Primary Examiner*—Walter Benson
*Assistant Examiner*—Karen Addison
(74) *Attorney, Agent, or Firm*—WPAT, P.C.; Anthony King

(57) ABSTRACT

A prestress-adjustable piezoelectric gripping device is provided, in which a prestressing device adjusts a prestressing force applied to a piezoelectric element of a piezoelectric unit on the basis of a feedback signal from a force-sensing unit, so as to adjust the friction between the piezoelectric unit and a gripping unit. By utilizing the deformation of the piezoelectric element to drive the gripping unit many times, the gripping velocity and gripping force of the gripping unit can be controlled, and the prestress-adjustable piezoelectric gripping device of the invention can achieve a long driving displacement while maintaining high precision.

14 Claims, 11 Drawing Sheets

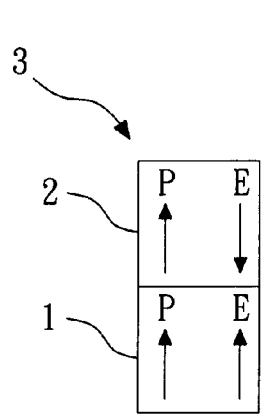 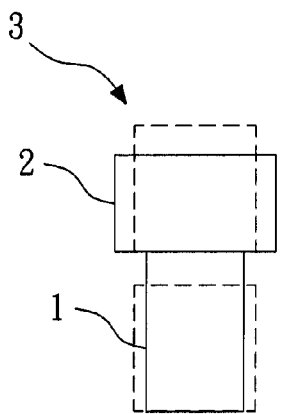
FIG. 3A (Prior Art)　　FIG. 3B (Prior Art)
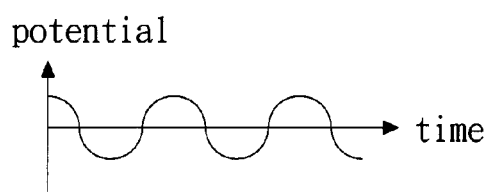 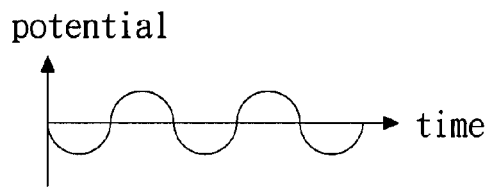
FIG. 4A (Prior Art)　　FIG. 4B (Prior Art)

PRESTRESS-ADJUSTABLE PIEZOELECTRIC GRIPPING DEVICE

BACKGROUND OF THE INVENTION

1. Field of the Invention

The present invention relates to a gripping device and more particularly to a prestress-adjustable piezoelectric gripping device.

2. Description of the Related Art

Micro-Grippers play an essential role in micro assembling systems, but a micro actuation device is an even more important technical module; it is indispensable if a strong gripping effect is to be achieved. Generally, the micro actuation devices or precision actuation devices are simply achieved by utilizing the micro deformation characteristic of a piezoelectric element. Common piezoelectric elements often adopt actuation modes of a longitudinal effect and a transverse effect (that is, horizontal or perpendicular configuration, and from the perspective of deformation, both longitudinal and transverse variations actually exist simultaneously, although the longitudinal and transverse effects are respectively adopted as the actuation modes) depending on different material polarization directions (P) and applied electric field directions (E). However, conventional micro grippers using a MEMS process have the following problems: an insufficient gripping velocity, an inadequate gripping force, and a short driving displacement.

Referring to FIG. 1, a conventional piezoelectric element is shown with a longitudinal effect actuation; the piezoelectric element 1 has a polarization direction (P) and an applied electric field direction (E), both of which are in a lengthwise direction of the conventional piezoelectric element 1 with a longitudinal effect actuation (i.e., configured in parallel). Under the stress generated in the polarization direction (P) and the electric field direction (E), the conventional piezoelectric element 1 with a longitudinal effect actuation is deformed longitudinally (as shown by the dashed line), so as to produce a longitudinal actuation force.

Referring to FIG. 2, a conventional piezoelectric element 2 is shown with a transverse effect actuation; the piezoelectric element 2 has a polarization direction (P) opposite an applied electric field direction (E). Both the polarization direction (P) and the applied electric field direction (E) are in a widthwise direction of the conventional piezoelectric element 2 with transverse effect actuation (i.e., configured in parallel). Under the stress generated in the polarization direction (P) and the applied electric field direction (E), the conventional piezoelectric element 2 with a transverse effect actuation is transversely deformed (as shown by the dashed line), so as to produce a transverse actuation force.

The above conventional piezoelectric element 1 with a longitudinal effect actuation and the conventional piezoelectric element 2 with a transverse effect actuation generate longitudinal effects and transverse effects respectively, which are characteristics generated when an external electric field direction (E) and a polarization direction (P) are configured in parallel. Unfortunately, the above two driving configurations cannot produce a shear effect while generating longitudinal and transverse effects. Therefore, with a single piezoelectric element, although a high actuation precision or a micro actuation effect can be achieved, the realized driving displacement is only up to tens of micrometers ($\mu m$). What's worse, some piezoelectric elements can only actuate up to the level of sub micrometers (sub-$\mu m$), and thus, it is rather difficult to grip a micro element with a larger size (e.g., more than 100 $\mu m$).

In addition, in order to prolong the driving displacement of the above conventional piezoelectric element 1 with a longitudinal effect actuation and the conventional piezoelectric element 2 with a transverse effect actuation, a plurality of piezoelectric elements must be stacked together.

FIGS. 3A and 3B show a conventional stacked piezoelectric actuation device 3, which includes the conventional piezoelectric element 1 with a longitudinal effect actuation and the conventional piezoelectric element 2 with a transverse effect actuation. The conventional piezoelectric element 2 with a transverse effect actuation is disposed on the conventional piezoelectric element 1 with a longitudinal effect actuation. FIG. 4A shows a first driving signal input to the conventional piezoelectric element 1 with a longitudinal effect actuation, and FIG. 4B shows a second driving signal input to the conventional piezoelectric element 2 with a transverse effect actuation. The first driving signal and the second driving signal have a phase difference.

As shown in FIGS. 3A to 4B, upon receiving the first driving signal, the conventional piezoelectric element 1 with a longitudinal effect actuation generates a longitudinal effect for longitudinal motions. Upon receiving the second driving signal, the conventional piezoelectric element 2 with a transverse effect actuation generates a transverse effect for transverse motions. The respective dashed lines in FIG. 3B indicate the conventional piezoelectric element 1 with a longitudinal effect actuation and the conventional piezoelectric element 2 with a transverse effect actuation before deformation. By controlling the first and second driving signals with a phase difference to respectively drive the conventional piezoelectric element 1 with a longitudinal effect actuation and the conventional piezoelectric element 2 with a transverse effect actuation, the conventional stacked piezoelectric actuation device 3 generates an approximately rectangular-shaped or ellipse-shaped movement track to achieve the effect of pushing or actuation.

The actuation mode of the above conventional stacked piezoelectric actuation device 3 is the most common and convenient aspect practiced among micro piezoelectric actuators. However, in order to generate a desirable movement track, two piezoelectric materials are required and the electric signals with two phases (the first and second driving signals) must be accurately matched, which is rather complicated in terms of hardware implementation.

Therefore, there is a need to provide a prestress-adjustable piezoelectric gripping device to solve the above problems.

SUMMARY OF THE INVENTION

The present invention provides a prestress-adjustable piezoelectric gripping device, which includes a base, a first sliding structure, a gripping unit, a piezoelectric unit, a force-sensing unit, and a prestressing device. The base has a surface. The first sliding structure is disposed above the surface and substantially parallel to the surface. The gripping unit includes a first gripping element and a second gripping element. The first gripping element has a first rod portion and a first gripping portion. The first sliding structure is used for guiding the first rod portion. The second gripping element is disposed above the surface and is configured opposite the first gripping element. The piezoelectric unit includes at least one piezoelectric element and at least one substrate. The piezoelectric element has a first side surface, a second side surface, and two electrodes. The first side surface is disposed on one side surface of the substrate. The second side surface is perpendicular to an axial extension direction of the first rod portion. The electrodes are disposed on the first and second side surfaces respectively. The force-sensing unit is disposed on the other side surface of the substrate. The prestressing device is connected to the force-sensing unit to provide a prestressing force so that the piezoelectric element contacts the first rod portion.

The prestressing device adjusts a prestressing force applied to the piezoelectric element according to a feedback signal from the force-sensing unit, so as to control the friction between the piezoelectric element and the first rod portion. By utilizing the deformation of the piezoelectric element to drive the first rod portion many times, the gripping velocity and the gripping force of the gripping unit are controlled, and thus, a long driving displacement can be achieved while maintaining high precision.

BRIEF DESCRIPTION OF THE DRAWINGS

FIGS. 3A and 3B are schematic views of an actuation of a conventional stacked piezoelectric actuation device;

FIG. 4A is a schematic view of a first driving signal input to the conventional piezoelectric element with a longitudinal effect actuation;

FIG. 4B is a schematic view of a second driving signal input to the conventional piezoelectric element with a transverse effect actuation;

DETAILED DESCRIPTION OF THE INVENTION

Figure 1:
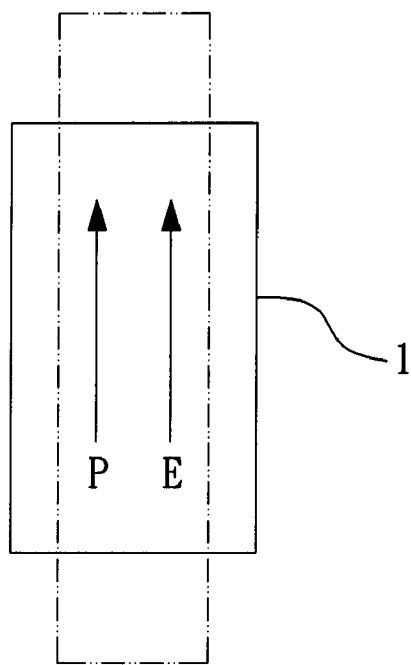
FIG. 1 is a schematic view of a conventional piezoelectric element with a longitudinal effect actuation.
Figure 2:
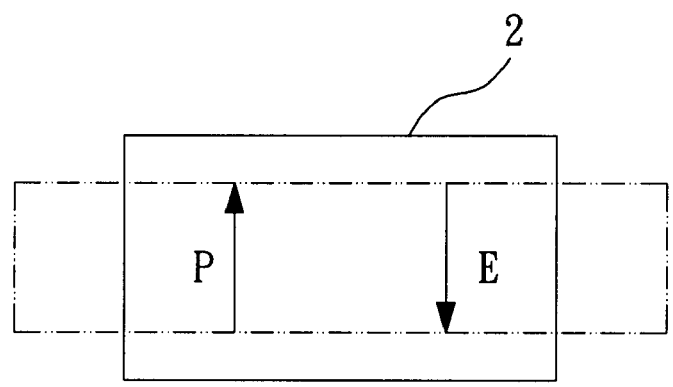
FIG. 2 is a schematic view of a conventional piezoelectric element with a transverse effect actuation.
Figure 5:
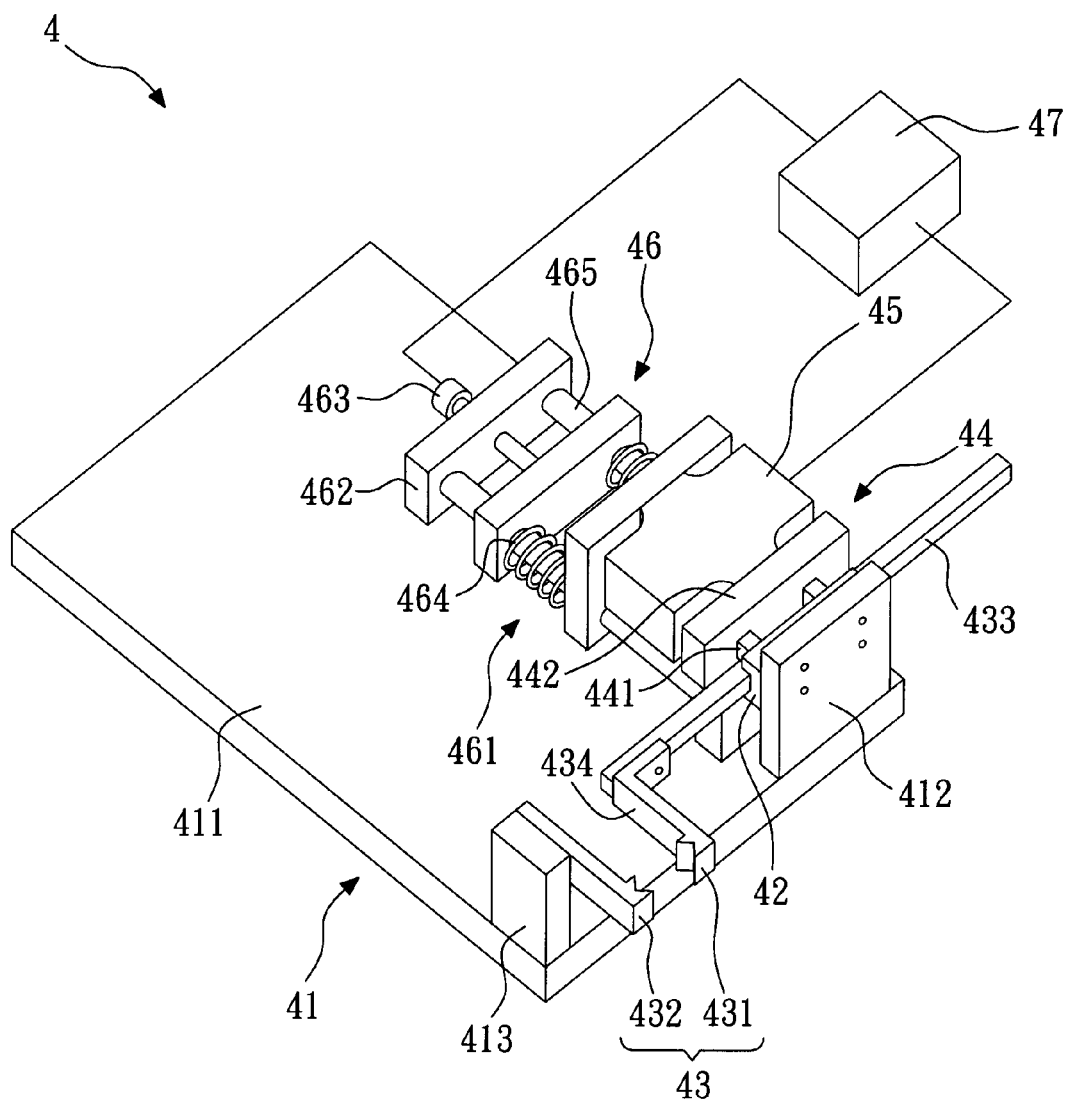
FIG. 5 is a stereogram of a prestress-adjustable piezoelectric gripping device according to a first embodiment of the present invention.
Figure 6:
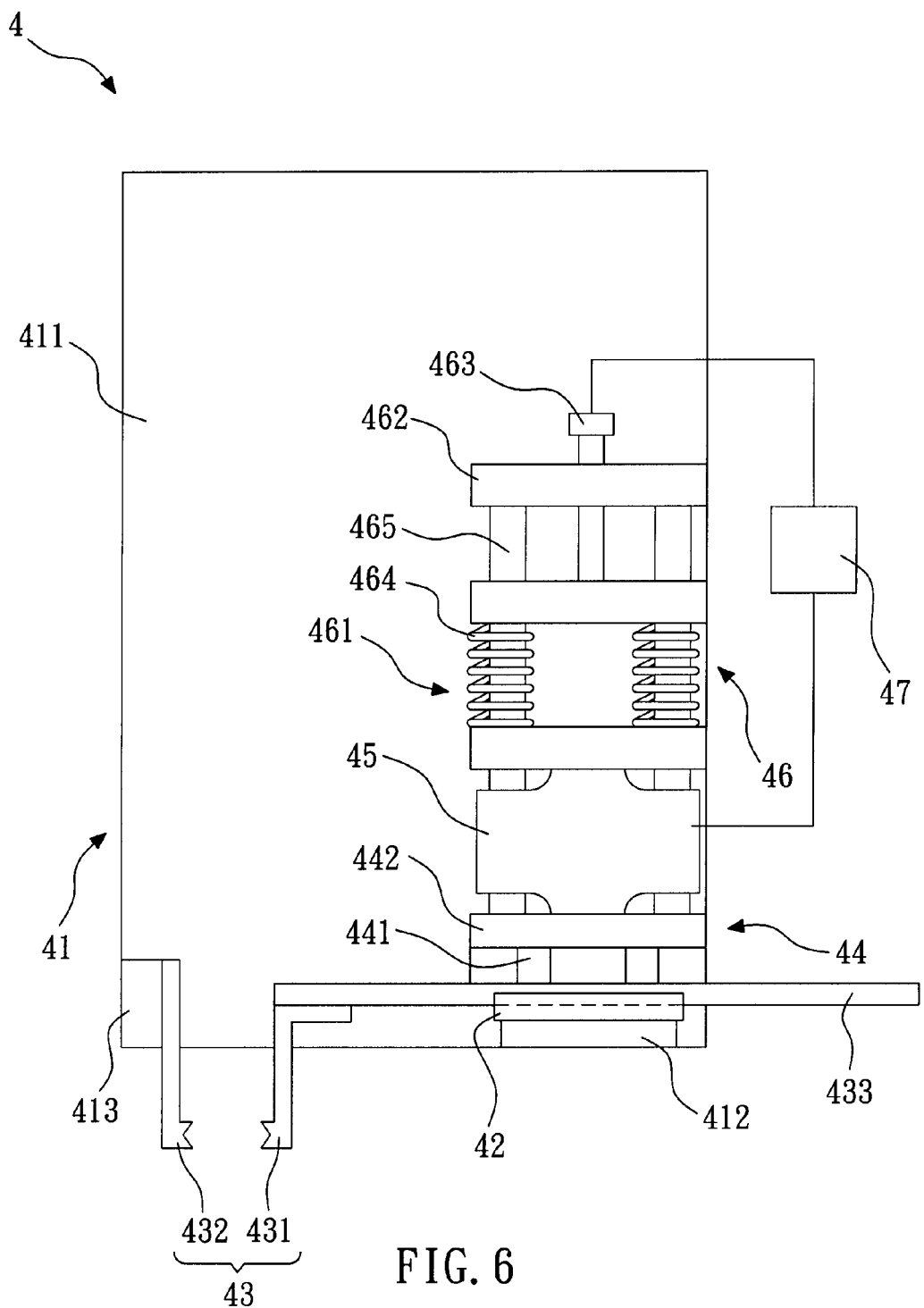
FIG. 6 is a top view of the prestress-adjustable piezoelectric gripping device according to the first embodiment of the present invention.
Figure 7:
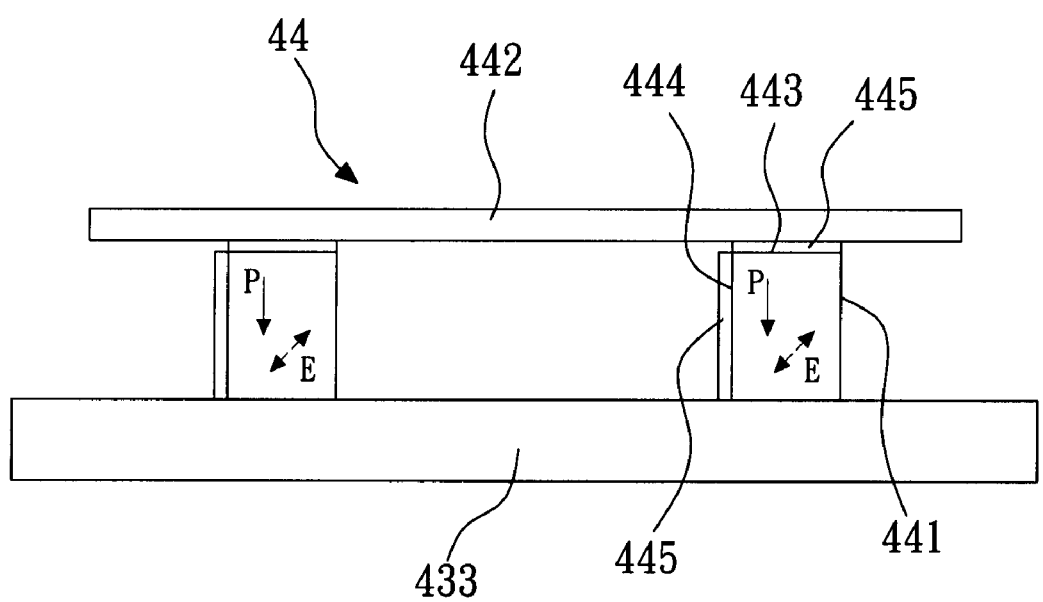
FIG. 7 is a schematic view of a first rod portion disposed on the piezoelectric element according to the first embodiment of the present invention.

FIG. 5 is a stereogram of a prestress-adjustable piezoelectric gripping device according to a first embodiment of the present invention, FIG. 6 is a top view of the prestress-adjustable piezoelectric gripping device according to the first embodiment of the present invention, and FIG. 7 is a schematic view of a first rod portion disposed on a piezoelectric element according to the first embodiment of the present invention. Referring to FIGS. 5-7, a prestress-adjustable piezoelectric gripping device 4 according to the first embodiment of the present invention is shown, and includes a base 41, a first sliding structure 42, a gripping unit 43, a piezoelectric unit 44, a force-sensing unit 45, and a prestressing device 46.

In this embodiment, the base 41 has a surface 411, a first post 412, and a second post 413. The first post 412 and the second post 413 are disposed on the surface 411 with a distance therebetween. The first sliding structure 42 is disposed on the first post 412 and substantially parallel to the surface 411. Preferably, the first sliding structure 42 is a precision linear slide rail.

The gripping unit 43 is disposed between the first post 412 and the second post 413 and includes a first gripping element 431 and a second gripping element 432. The first gripping element 431 has a first rod portion 433 and a first gripping portion 434. The first sliding structure 42 is used for guiding the first rod portion 433. The second gripping element 432 is disposed on the second post 413 above the surface 411 and is configured opposite the first gripping element 431.

The first sliding structure 42 utilizes a precision linear slide rail as a basis for a linear reciprocating motion of the first gripping element 431, so as to effectively enhance the linearity in the operations of the prestress-adjustable piezoelectric gripping device 4 and simplify the mechanism design and assembling process, so as to improve the sliding flexibility of the gripping unit 43.

The piezoelectric unit 44 includes at least one piezoelectric element and at least one substrate. In this embodiment, the piezoelectric unit 44 includes two piezoelectric elements 441 and a substrate 442. The piezoelectric elements 441 contact the first rod portion 433. Each piezoelectric element 441 has a first side surface 443, a second side surface 444, and two electrodes 445. The first side surface 443 is disposed on one side surface of the substrate 442, and the second side surface 444 is perpendicular to an axial extension direction of the first rod portion 433. The electrodes 445 are disposed on the first side surface 443 and the second side surface 444 respectively.

Figure 8:
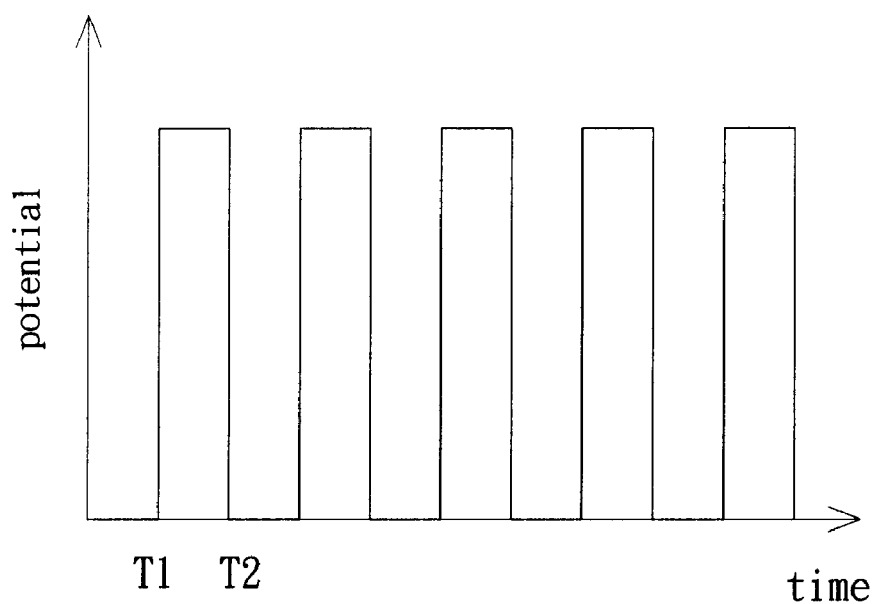
FIG. 8 is a graph of time to potential of a square wave single-phase driving signal according to the present invention.
Figure 9:
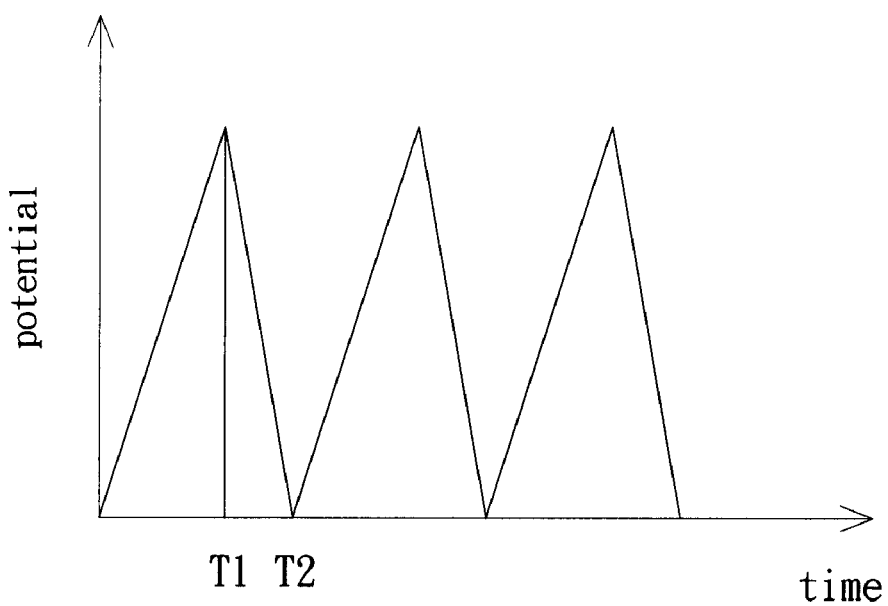
FIG. 9 is a graph of time to potential of a saw wave single-phase driving signal according to the present invention.
Figure 10:
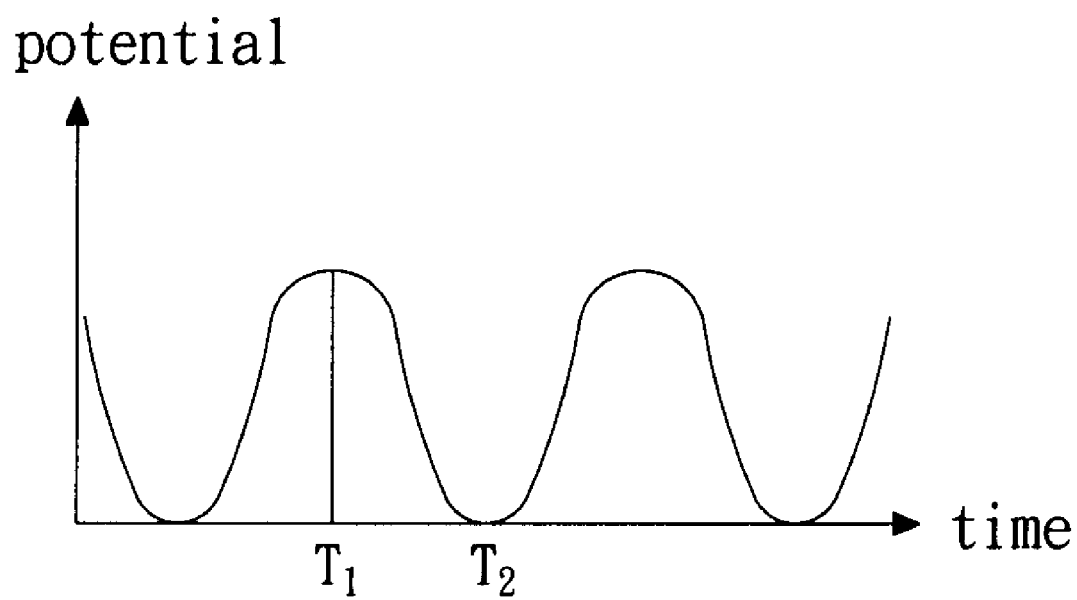
FIG. 10 is a graph of time to potential of a sinusoidal wave single-phase driving signal according to the present invention.

In this embodiment, as the piezoelectric elements 441 are configured into cubes and the electrodes 445 are perpendicularly disposed on the first side surface 443 and the second side surface 444 of each piezoelectric element 441 respectively (i.e., the electrodes 445 are not configured in parallel), a deviation angle of 45° is formed between an electric field direction (E) and a polarization direction (P) of each piezoelectric element 441. When a single-phase driving signal is electrically connected to the electrodes 445, the piezoelectric elements 441 generate a longitudinal effect, a transverse effect, and a shear effect simultaneously (producing an ellipse-shaped movement track). The single-phase driving signal is preferably a square wave periodic signal, a saw wave periodic signal, or a sinusoidal wave periodic signal, such as a sine wave periodic signal or a cosine wave periodic signal, as shown in FIGS. 8, 9, and 10 respectively.

Figure 11:
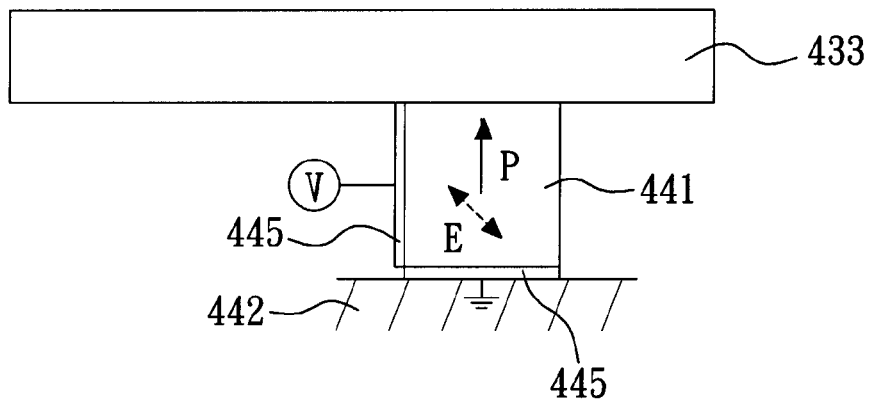
FIGS. 11 to 13 are schematic views of motions of a piezoelectric element according to the present invention.
Figure 12:
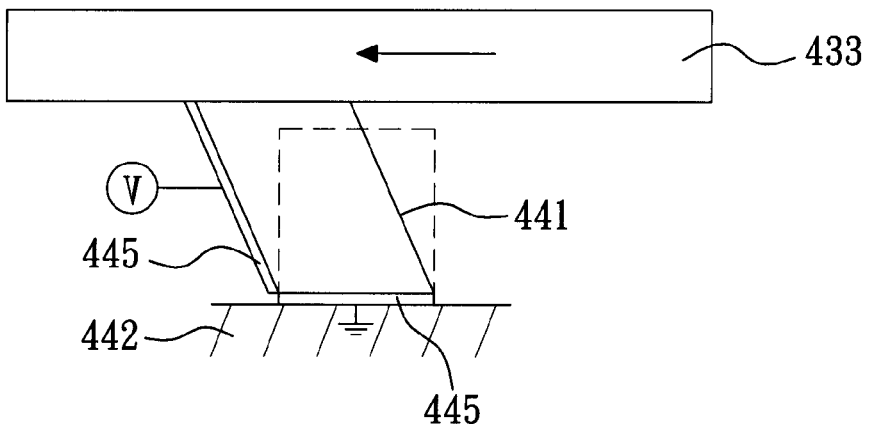
Figure 13:
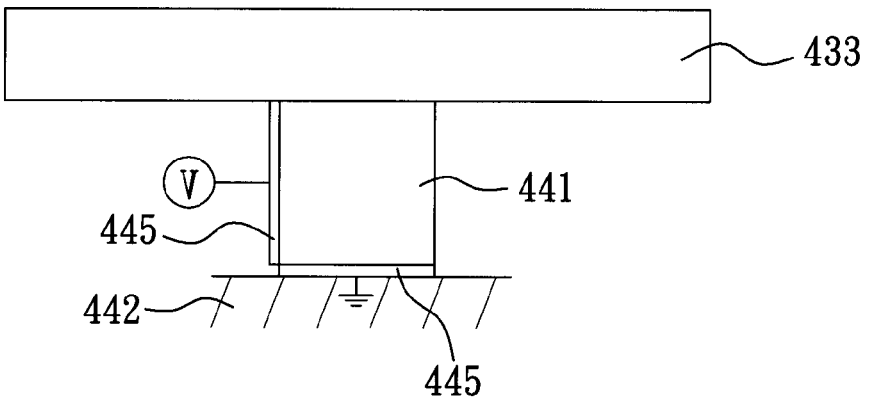

FIGS. 11 to 13 are schematic views of an actuation of a piezoelectric element according to the present invention. The following descriptions are made with reference to corresponding reference numerals in the prestress-adjustable piezoelectric gripping device 4 according to the first embodiment of the present invention. As shown in FIG. 11, when a single-phase driving signal (V) applied to the electrodes 445 has a potential difference of zero, the piezoelectric elements 441 still maintain the original cubes when no single-phase driving signal is applied. As shown in FIGS. 9 and 12, a saw wave periodic signal in FIG. 9 is taken as an example of the single-phase driving signal. At the time T1, the single-phase driving signal has a positive potential difference, so that the piezoelectric elements 441 generate a pulling longitudinal effect and a leftward shear effect. As shown in FIGS. 9 and 13, when the potential difference of the single-phase driving signal drops to zero at the time T2, the piezoelectric elements 441 resume the original structural configuration when no single-phase driving signal is applied.

When the single-phase driving signal is repeatedly applied to the electrodes 445 in such a manner, the piezoelectric elements 441 repeatedly present a longitudinal effect and a leftwards shear effect and resume the original structural configuration when no single-phase driving signal is applied. Therefore, when the single-phase driving signal is applied, the piezoelectric elements 441 are deformed in two dimensions, so that such driving signal is suitable to serve as a power source of the prestress-adjustable piezoelectric gripping device, and the prestress-adjustable piezoelectric gripping device is enabled to maintain excellent precision. In addition, the gripping force of the gripping unit can be enhanced through a combination of a plurality of piezoelectric elements, so as to alleviate the problem of the conventional micro grippers using a MEMS process in which the gripping force is insufficient.

As shown in FIGS. 5 and 6, the force-sensing unit 45 is disposed on the other side surface of the substrate 442 in the piezoelectric unit 44. The force-sensing unit 45 is preferably a force gauge. The prestressing device 46 is connected to the force-sensing unit 45 to provide a prestressing force so that the piezoelectric elements 441 contact the first rod portion 433. The prestressing device 46 may be a pneumatic device, an oil pressure device, or a spring pressure device (such as a helical spring pressure device).

In this embodiment, the prestressing device 46 is a spring pressure device and includes a movable elasticity assembly 461, a fixed base 462, and a stepping unit 463. A side surface of the movable elasticity assembly 461 is connected to the force-sensing unit 45 and the movable elasticity assembly 461 is provided with at least one elastic element 464 (such as a spring). The fixed base 462 is fixed on the surface 411 of the base 41 and has at least one rod 465. The rod 465 passes through the elastic element 464 and penetrates the movable elasticity assembly 461, so that the movable elasticity assembly 461 can move along the rod 465. The stepping unit 463 is disposed on the fixed base 462 and contacts the other side surface of the movable elasticity assembly 461. The movable elasticity assembly 461 is actuated by the stepping unit 463, so as to apply a prestressing force to the piezoelectric elements 441 to control the friction between the piezoelectric elements 441 and the first rod portion 433. Once the piezoelectric elements 441 contact the first rod portion 433, a feedback signal is detected by the force-sensing unit 45.

In this embodiment, the prestress-adjustable piezoelectric gripping device 4 further includes: a control unit 47, connected to the force-sensing unit 45 and the prestressing device 46, for controlling the prestressing device 46 on the basis of the feedback signal and dynamically adjusting the prestressing force accordingly, so as to control the friction between the piezoelectric elements 441 and the first rod portion 433. By utilizing the deformation of the piezoelectric elements 441 to drive the first rod portion 433 many times, the gripping velocity and the gripping force of the gripping unit 43 are controlled, so as to achieve a long driving displacement.

Figure 14:
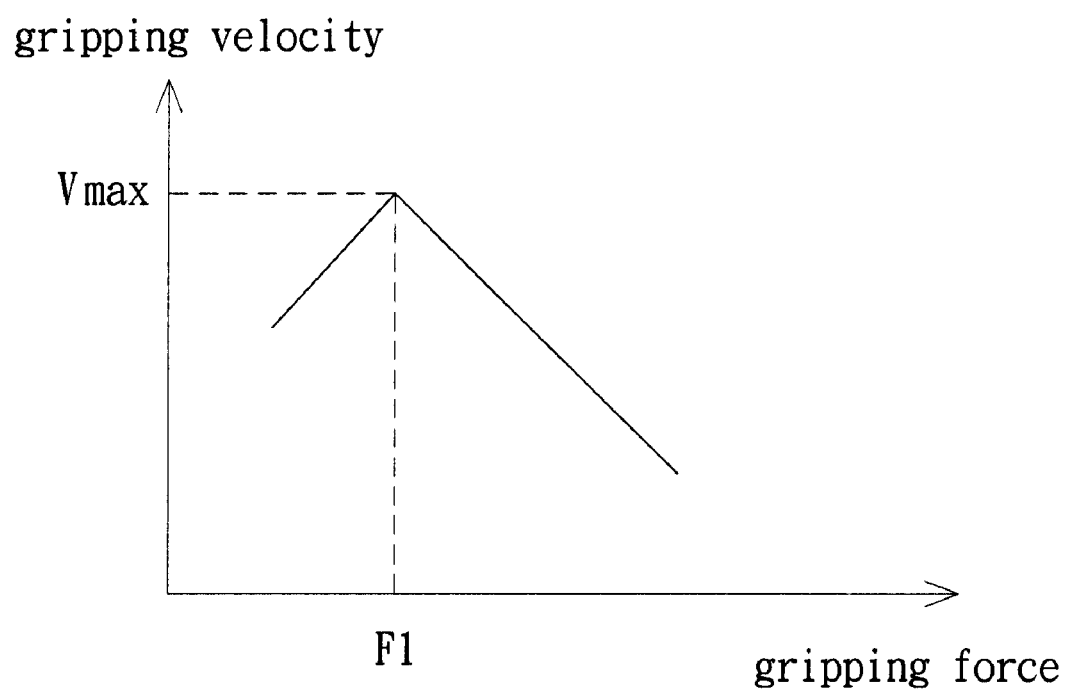
FIG. 14 is a relation graph of a gripping velocity and a gripping force of a prestress-adjustable piezoelectric gripping device according to the present invention.

FIG. 14 is a relation graph of a gripping velocity and a gripping force of a prestress-adjustable piezoelectric gripping device according to the present invention. As shown in FIG. 14, the gripping velocity and the gripping force of the prestress-adjustable piezoelectric gripping device are closely associated with each other. For example, as shown in FIG. 14, when the gripping force is F1, the prestress-adjustable piezoelectric gripping device has a maximum gripping velocity of Vmax. Therefore, by adjusting the prestressing force to control the friction between the piezoelectric unit 44 and the gripping unit 43, the desirable gripping velocity and gripping force can be achieved.

Figure 15:
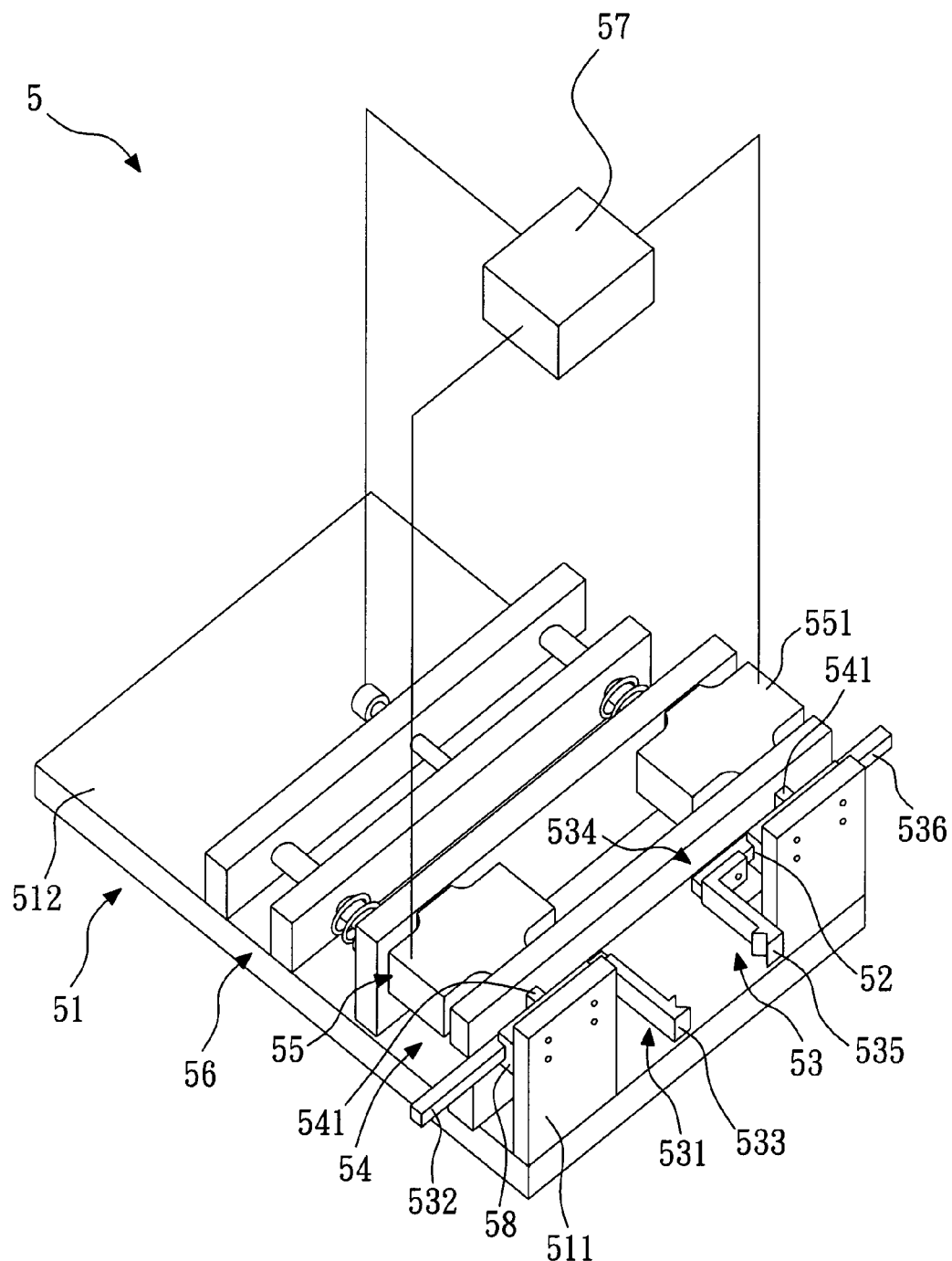
FIG. 15 is a stereogram of a prestress-adjustable piezoelectric gripping device according to a second embodiment of the present invention.

FIG. 15 is a stereogram of a prestress-adjustable piezoelectric gripping device according to a second embodiment of the present invention. A prestress-adjustable piezoelectric gripping device 5 includes a base 51, a first sliding structure 52, a gripping unit 53, a piezoelectric unit 54, a force-sensing unit 55, a prestressing device 56, and a control unit 57. In the second embodiment, the prestress-adjustable piezoelectric gripping device 5 further includes a second sliding structure 58. The force-sensing unit 55 includes two force-sensing elements 551, the piezoelectric unit 54 includes two piezoelectric elements 541, and the second sliding structure 58 is disposed on a second post 511 of the base 51.

The second sliding structure 58 is substantially parallel to a surface 512 of the base 51. A second gripping element 531 of the gripping unit 53 has a second rod portion 532 and a second gripping portion 533. The second sliding structure 58 is used for guiding the second rod portion 532. The second gripping portion 533 is configured opposite a first gripping portion 535 of a first gripping element 534 in the gripping unit 53. The piezoelectric elements 541 contact a first rod portion 536 of the first gripping element 534 and the second rod portion 532 of the second gripping element 531 respectively. The force-sensing elements 551 are configured opposite the piezoelectric elements 541 respectively. The first sliding structure 52 and the second sliding structure 58 are preferably precision linear slide rails.

Figure 16:
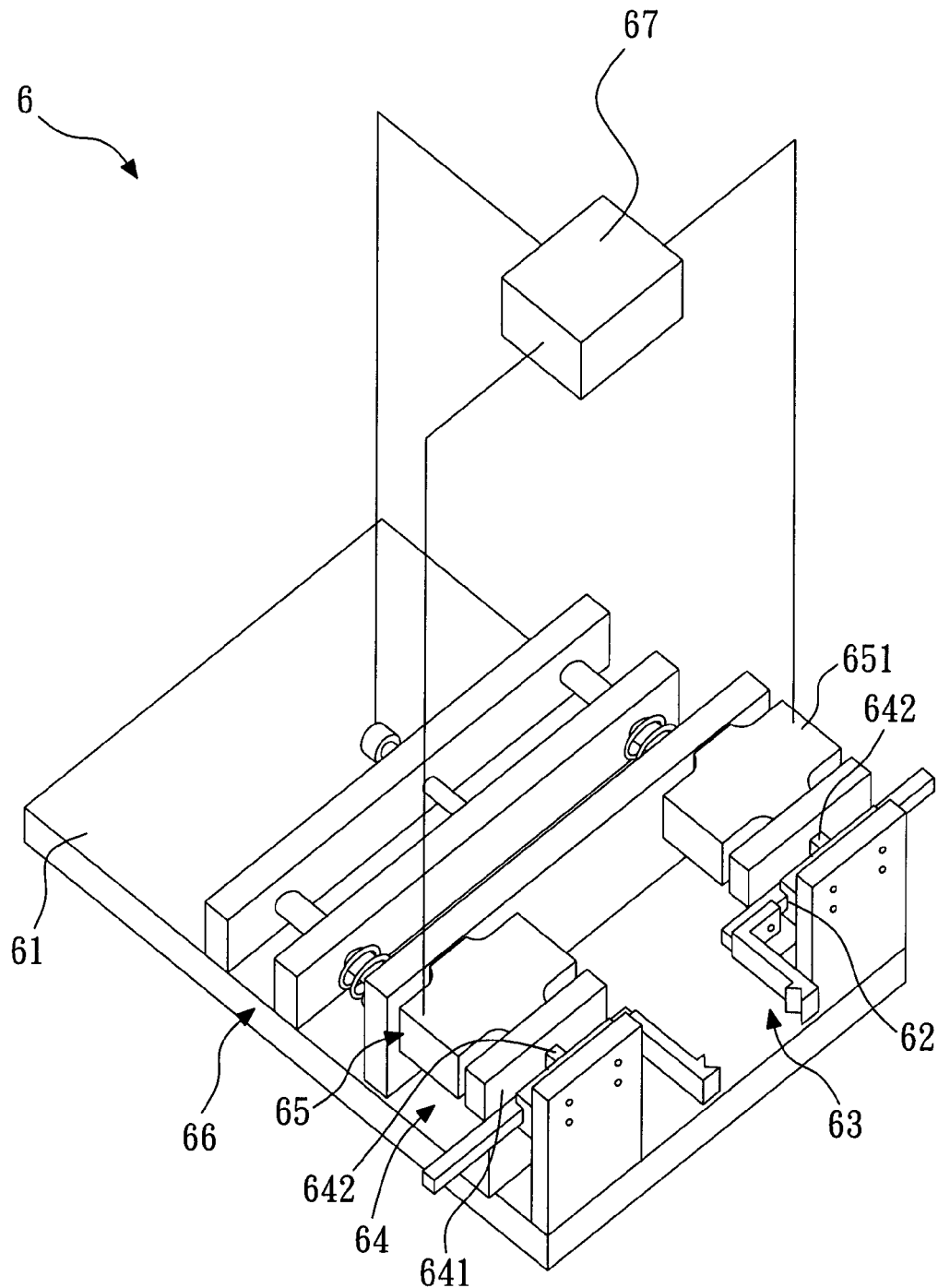
FIG. 16 is a stereogram of a prestress-adjustable piezoelectric gripping device according to a third embodiment of the present invention.

FIG. 16 is a stereogram of a prestress-adjustable piezoelectric gripping device according to a third embodiment of the present invention. A prestress-adjustable piezoelectric gripping device 6 includes a base 61, a first sliding structure 62, a gripping unit 63, a piezoelectric unit 64, a force-sensing unit 65, a prestressing device 66, and a control unit 67. Unlike the prestress-adjustable piezoelectric gripping device 5 in FIG. 15 according to the second embodiment, the piezoelectric unit 64 according to the third embodiment has two substrates 641, and each substrate 641 is disposed between a piezoelectric element 642 and a force-sensing element 651 opposite each other. The other components are the same as those in the prestress-adjustable piezoelectric gripping device 5 according to the second embodiment, and thus are not described again herein.

The prestressing device according to the present invention adjusts a prestressing force applied to the piezoelectric element on the basis of a feedback signal from the force-sensing unit, so as to control the friction between the piezoelectric element and the first or second rod portion. By utilizing the deformation of the piezoelectric element to drive the first or second rod portion many times, the gripping velocity and the gripping force of the gripping unit can be controlled, thereby achieving a long driving displacement while maintaining high precision.

While the embodiments of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A prestress-adjustable piezoelectric gripping device, comprising:
   a base, having a surface;
   a first sliding structure, disposed above the surface and substantially parallel to the surface;
   a gripping unit, having a first gripping element and a second gripping element, wherein the first gripping element has a first rod portion and a first gripping portion, the first sliding structure is used for guiding the first rod portion, and the second gripping element is disposed above the surface and is configured opposite the first gripping element;
   a piezoelectric unit, having at least one piezoelectric element and at least one substrate, wherein the piezoelectric element has a first side surface, a second side surface, and two electrodes, the first side surface is disposed on a side surface of the substrate, the second side surface is perpendicular to an axial extension direction of the first rod portion, and the electrodes are disposed on the first and second side surfaces respectively;
   a force-sensing unit, disposed on the other side surface of the substrate; and
   a prestressing device, connected to the force-sensing unit, for providing a prestressing force so that the piezoelectric element contacts the first rod portion.

2. The piezoelectric gripping device according to claim 1, wherein the base comprises a first post, and the first sliding structure is disposed on the first post.

3. The piezoelectric gripping device according to claim 1, wherein the first sliding structure is a precision linear slide rail.

4. The piezoelectric gripping device according to claim 2, wherein the base further comprises a second post, and the second gripping element is disposed on the second post.

5. The piezoelectric gripping device according to claim 4, further comprising a second sliding structure, wherein the force-sensing unit comprises two force-sensing elements, the piezoelectric unit comprises two piezoelectric elements, the second sliding structure is disposed on the second post and is configured substantially parallel to the surface, the second gripping element has a second rod portion and a second gripping portion, the second sliding structure is used for guiding the second rod portion, the second gripping portion is opposite the first gripping portion, the piezoelectric elements contact the first and second rod portions respectively, and the force-sensing elements are opposite the piezoelectric elements respectively.

6. The piezoelectric gripping device according to claim 5, wherein the piezoelectric unit has two substrates and each of the substrates is disposed between the piezoelectric element and the force-sensing element opposite each other.

7. The piezoelectric gripping device according to claim 5, wherein the first and second sliding structures are precision linear slide rails.

8. The piezoelectric gripping device according to claim 1, wherein the force-sensing unit is a force gauge.

9. The piezoelectric gripping device according to claim 1, wherein the prestressing device is a pneumatic device, an oil pressure device, or a spring pressure device.

10. The piezoelectric gripping device according to claim 9, wherein the spring pressure device is a helical spring pressure device.

11. The piezoelectric gripping device according to claim 1, further comprising a control unit, connected to the force-sensing unit and the prestressing device, for controlling the prestressing device on the basis of a feedback signal from the force-sensing unit, so as to adjust the prestressing force.

12. The piezoelectric gripping device according to claim 1, wherein the electrodes of the piezoelectric element receive a single-phase driving signal to drive the piezoelectric element to generate a longitudinal effect, a transverse effect, and a shear effect.

13. The piezoelectric gripping device according to claim 12, wherein the single-phase driving signal is a square wave periodic signal, a saw wave periodic signal, or a sinusoidal wave periodic signal.

14. The piezoelectric gripping device according to claim 13, wherein the sinusoidal wave periodic signal is a sine wave periodic signal or a cosine wave periodic signal.

* * * * *